United States Patent [19]

Von Kohorn

[11] 4,318,892

[45] Mar. 9, 1982

[54] HEAP LEACHING DEVICE

[76] Inventor: Henry Von Kohorn, 22 Perkins Rd., Greenwich, Conn. 06830

[21] Appl. No.: 205,877

[22] Filed: Nov. 10, 1980

[51] Int. Cl.³ .............................................. B01D 11/02
[52] U.S. Cl. ................................. 422/279; 75/101 R; 299/5; 422/274; 423/27; 423/658.5
[58] Field of Search ............................... 422/274–279; 210/473; 423/1, 27, 29, 658.5; 239/37, 57; 299/5, 11; 75/101 R

[56] References Cited

U.S. PATENT DOCUMENTS

| 245,006 | 8/1881 | Moore, Sr. | 422/274 |
|---|---|---|---|
| 664,387 | 12/1900 | Doderlein | 422/278 X |
| 1,339,195 | 5/1920 | Grover | 210/473 X |
| 1,839,892 | 1/1932 | Pew, Jr. | 210/473 X |
| 2,641,506 | 6/1953 | Lowthers | 422/277 X |
| 2,880,077 | 3/1959 | Floria | 422/277 X |
| 3,639,003 | 2/1972 | Spedden et al. | 299/5 |
| 3,809,430 | 5/1974 | Michaelson et al. | 423/27 X |
| 3,834,760 | 9/1974 | Spedden et al. | 75/101 R X |
| 3,840,365 | 10/1974 | Hammes, Sr. et al. | 423/27 X |
| 3,867,101 | 2/1975 | Herring | 422/274 X |
| 4,017,309 | 4/1977 | Johnson | 75/101 R |
| 4,091,070 | 5/1978 | Riggs et al. | 423/41 |

Primary Examiner—Richard L. Chiesa
Attorney, Agent, or Firm—Perman & Green

[57] ABSTRACT

Disclosed is a hollow, elongated heap leaching device for use in above-ground leaching of metal bearing ores. The device has an annular cross-section, an inlet opening near its upper end, a restriction or closure at or near its lower end and narrow slits in its walls above the restriction or closure. The cross-sectional area at its lower end must be sufficiently large to allow it to unsupportedly rest vertically on a leach pad or layer of ore while ore is piled against it.

6 Claims, 5 Drawing Figures

HEAP LEACHING DEVICE

RELATED APPLICATIONS

This application discloses a device which may be employed in the method described in application, Ser. No. 205,878, filed Nov. 10, 1980, now U.S. Pat. No. 4,301,121, which method application is a continuation-in-part of co-pending application, Ser. No. 133,516, filed Mar. 24, 1980 and now U.S. Pat. No. 4,279,868.

BACKGROUND OF THE DISCLOSURE

I. Field of the Invention

This invention relates, in general, to a device used in a method for above-ground heap leaching of metal-bearing ores and, more specifically, to an economical device to improve the percolation of leaching solution through an ore body to be leached and to bring leaching solution in contact with significantly increased surface areas of the crushed ore pieces in order to obtain a higher rate of extraction of metals from ore.

II. Description of the Prior Art

Hydrometallurgical work done during the last two decades have included efforts to separate metals, for example gold and silver, from gangue material or host rock, by leaching with a solvent, such as cyanide solutions. Much of the early work was done by the Reno Metallurgy Research Center of the U.S. Bureau of Mines in Reno, Nevada. This is further explained in a paper entitled "Silver Extraction from Marginal Resources" by H. J. Heiner, D. G. Peterson and R. E. Lindstrom, delivered at the annual meeting of the American Institute of Mining, Metallurgical & Petroleum Engineers, in New York City, N.Y. on Feb. 16, 1975.

In the extraction of metals from metal-bearing ore by leaching, the recovery of metals is generally far inferior to the recovery rates achieved by other known methods, for example roasting and flotation. One reason for this inferior recovery is the inability to efficiently heap leach rock which has been finely ground since the leaching solution cannot satisfactorily filter through the densely packed ore particles. On the other hand, leaching ore crushed to a size common to heap leaching, for example about two to five centimeters, results in poor and uneven penetration of the leaching solution into the crushed ore. This inferior penetration is due in part to the larger size of the crushed ore pieces as well as to the stationary position of the crushed ore.

In heap leaching, the leaching solution will normally pursue a downward path of least resistance through the rock pile or heap. This phenomenon is known as channeling and results in uneven leaching action. It is possible, for the purpose of improving recovery, to rearrange the ore and divert channeling by setting off small explosive charges within the leach pile. This approach, however, has the drawback of producing fines, i.e., small rock particles which are densely packed and impair the filtering down of the leaching solution.

In co-pending application, Ser. No. 133,516 there is described an improved method of leaching metal bearing ores, wherein removable, void-forming members are placed near the bottom of the ore body and removed during the leaching process, causing partial internal collapse and shifting of the ore, thus exposing additional ore surfaces to the effect of the leaching solution. While this process has many advantages, it also has certain limitations. For example, in certain instances where ore bodies to be heap leached are relatively wide or closely spaced, it may be difficult, if not impossible, to pull the void-creating members out in a substantially horizontal direction towards the sides of the heap. This is the case when the heap or ore body is either continually widened by adding ore to its sides or where the width of the heap is such that the void-creating members have to be so long that the friction to be overcome in pulling them out would be excessive. It is also the case where heaps are so closely spaced that there is insufficient room between neighboring heaps to pull void-creating members out is a substantially horizontal direction.

In the continuation-in-part application of Ser. No. 133,516 there is disclosed a method of above-ground leaching which is devoid of the above-noted disadvantages. More specifically there is disclosed a method which comprises (a) providing an ore body to be leached having positioned therein void-creating members, said members being positioned substantially vertical or at an angle to the horizontal plane in order that they are capable of being pulled out of said ore body in a substantially upward direction; (b) partially performing the leaching; (c) removing said members by pulling out in a substantially upward direction, thereby creating internal voids and causing shifting of ore in said ore body; and (d) completing the leaching.

The disclosures in co-pending application, Ser. No. 133,516 and said continuation-in-part thereof, filed Nov. 10, 1980 are incorporated herein by reference.

It is, therefore, an object of the present invention to provide an economical device which may be used in the above-referenced methods.

It is another object of this invention to provide a device to improve the percolation of leaching solution through an ore body to be leached and to bring leaching solution in contact with significantly increased surface areas of the crushed ore pieces in order to obtain a higher rate of extraction of metals from the ore.

It is still another object of this invention to provide a device for leaching metal bearing ores wherein void-creating members may be used in conjunction with relatively wide or closely spaced heaps of ore.

It is yet another object of the present invention to provide a device for leaching metal bearing ores wherein the void-creating members can be pulled out in an upward direction by standard earth moving equipment.

It is another object of this invention to provide a device for leaching metal bearing ores wherein the ore near the bottom of the heap, which is packed more densely and which is affected more by the channeling effect than the ore near the top of the heap, comes in contact with a greater proportion of the non-weakened leaching solution.

SUMMARY OF THE INVENTION

The foregoing objects and others are accomplished in accordance with this invention, generally speaking, by providing a device to be used in above-ground leaching of metal bearing ores, said device comprising a hollow elongated member having (1) an inlet opening for leaching solution near its upper end; (2) a restriction or closure at or near its lower end so that leaching solution is accumulated in said hollow member to create a hydrostatic head or pressure created by a pump therein; (3) above said closure and along at least a section of its length, wall openings for the outward discharge of leaching solution into the leach levels, wherein (a) the configuration of the individual wall openings is such as to prevent ore pieces of nominal size to pass through said openings and (b) the cumulative cross-sectional area of said wall openings progressively increases upwardly from said closure at such a rate that at least a substantial part of the leaching solution fed into said hollow member through said upper inlet will be discharged through said wall openings; and (4) means near its upper end for attaching hoisting machinery for pulling out said hollow member in a substantially upward direction so as to create a void in the leach pile and movement of ore therein.

A plurality of such hollow elongated devices is generally provided in the crushed ore body to be leached and they are generally positioned substantially vertical or at an acute angle to the vertical plane.

When leaching has been partially performed, the member is pulled out in an upwardly direction, as a result of which voids are created in the ore body. The crushed ore pieces, in filling such voids, shift, rotate and separate, thus exposing additional ore surfaces to the effect of the leaching solution, intensifying the leaching process and further counteracting channeling.

BRIEF DESCRIPTION OF THE DRAWINGS

FIGS. 1, 2 and 4 depict devices having open upper ends or inlets.

FIG. 3 is a view of the device being half open and half closed at its upper end.

FIG. 5 is a view of a device being closed at the top and having a separate upper inlet.

DETAILED DESCRIPTION OF THE INVENTION

Figure 1:
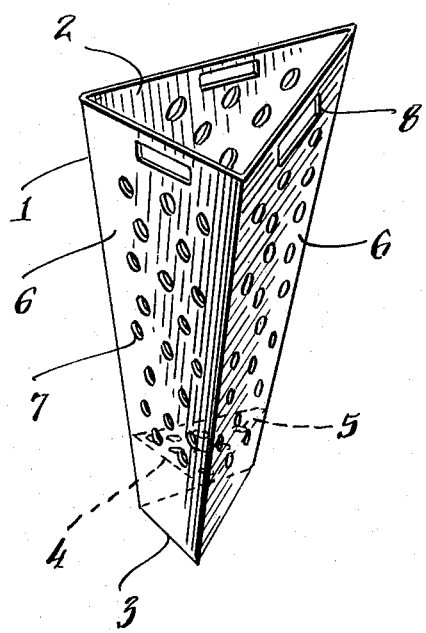
FIG. 1 is a view of the device having a triangular cross-section and being tapered.

The device according to the present invention aids in the increased extraction of metals from metal bearing ores by the method described in the said co-pending applications. According to an embodiment of said method, removable, elongated, hollow, void-creating members, such as perforated ducts and pipes with an inlet opening at the upper end and restricted lower outflow openings, are provided in an ore body in a substantially vertical attitude or at an angle to the horizontal plane. Leaching solution is fed into said members at or near their upper ends. The number and size of the perforations or openings in said members and the volume of leaching solution introduced determine the hydrostatic head which builds up in each such member. The hydrostatic head in turn determines the force with which the leaching solution is caused to be discharged from said perforations. The volume of leaching solution introduced into the leach pile through said members is in addition to the volume of leaching solution brought to bear upon the ore according to normal heap leaching practice, such as through sprinklers.

According to one embodiment of the device, the hollow member which rests directly on the leach pad, has an unperforated lower closure or end piece, so that all of the leaching solution fed into the device through the opening or inlet near its upper end is discharged through perforations or openings in the wall, or through openings between the walls of the member. The walls of said members may be flat or they may be rounded or cylindrical, such as in a pipe. As an illustration, four perforated rectangular sheets may be welded into a rectangular or square duct-like hollow member with perforated walls; or three slightly wedge-shaped, perforated pieces may be welded together to form a tapered hollow, void-creating member, said member having a triangular cross-section which is somewhat smaller near the lower end of the tapered member than at its upper end, thus facilitating pulling it out of the ore in an upwardly direction.

According to another embodiment, the device may comprise a triangular or rectangular duct or an open-ended round pipe, having a partition positioned in the lower section of the device, but not necessarily at its lower end. The partition thus serves as an internal reinforcing member. The partition may have openings to permit the restricted downward flow of the leaching solution through the essentially vertically positioned device. The device has wall openings at least above the said partition. More than one partition and/or other types of reinforcing members, such as struts, may be provided. The partition and other reinforcing members make it possible to use thinner gauge material, such as steel, in fabricating the device.

By positioning the void-creating members in a nearly upright position, the pressure on the walls of the device resulting from the weight of the ore is almost completely eliminated. The only force the device must be able to withstand is the lateral force exerted in an essentially horizontal direction by the ore pieces surrounding the vertical device; this condition greatly diminishes the force required to pull the device out of the ore in an upward direction.

According to another embodiment of the device, there is provided at its lower end a perforated end piece. Devices of this type normally rest on a previously deposited layer of the ore to be leached. The number and size of the perforations or openings in the lower end piece are such as to cause the discharge of the leaching solution from the device to be reduced sufficiently so as to prevent the device from functioning as a mere unrestricted flow-through duct; the objective being to accumulate in the device, above the partition, a head of leaching solution of sufficient hydrostatic force to cause the outwardly discharge of the leaching solution into the ore body through the wall openings. The optimum size and number of the perforations must be determined empirically in accordance with the nominal size and other characteristics of the ore, the height and the density of the pile. It is a prerequisite, however, that in all instances the cross-sectional dimensions of the individual wall openings be smaller than the nominal cross-section of the crushed ore pieces, or that the configuration of these openings be such, as for instance in slits, as to prevent the passage through them of ore pieces of nominal or even smaller than nominal size. It follows that, in order to ensure that sufficient leaching solution will accumulate in the device to create the desired hydrostatic head, yet preventing the overflowing of most of the leaching solution at the top of the device, the cumulative cross-sectional area of said wall openings must progressively increase upward from said partition at a higher than proportionate rate; each individual opening having such shape, however, as to prevent the passage through it of crushed ore pieces having the nominal size of the crushed ore. Advantageous, and preferred configurations therefore, are narrow slits which, in an upward direction, may increase in length and number, so that even small ore pieces cannot fall into the hollow member although the total cross-section of each individual slit may be larger than that of the individual ore pieces.

As an illustration, the individual slits used for crushed ore having a nominal size of 2 centimeters may have a width of 1 centimeter and a length of 10 centimeters or more. The slits may be vertical or horizontal. The cumulative cross-sections of the slits increases in an upward direction from the partition, which ultimately may exceed the cross-section of the upper inlet opening. The upper inlet may be the upper ind of the device itself, it may be a separate inlet, or it may be a portion of it. The slits may be wider near the upper end of the device than near its lower end. When the slits have reached their maximum width as explained above, then, in order further to increase the outward discharge, the length and number of the slits is progressively increased towards the upper end of the member until the optimum outward discharge of the leaching solution is brought about, taking into consideration the resistance offered the outflowing solution by the packed ore and the fact that the hydrostatic head exerts greater force in the lower part of the device. If the inflow of leaching solution at the upper end of the device is so great that not all of the leaching solution is discharged through the wall openings, a part of the solution may overflow, provided, however, that at least a substantial part of the solution is discharged through the walls.

Pipes having a restricted upper inlet may be filled with leaching solution from a pump which permits keeping the leaching solution in the pipe under higher than atmospheric pressure, thus aiding in the discharge of the leaching solution through the openings provided. The pipes can be connected to a pump for leaching solution directly at their restricted upper end or they can be closed at their upper end and provided with a separate inlet for the solution.

According to an embodiment of the invention, the device is tapered and has a round configuration; the cross-section at the upper end of the device has one and one half times the cross-section at the lower end of the device, the lower end being truncated so as to permit the device to stand upright on the leach pad or on a layer of ore previously deposited on the leach pad. The leaching solution is discharged from the upper perforations of the device over a larger horizontal area and will therefore percolate down and contact different parts of the ore body from those contacted by leaching solution discharged at the lower levels of the device and closer to the central axis of the elongated member. This arrangement ensures a more even distribution of the leaching solution and further counteracts channeling.

The device has means near its upper end for attaching machinery capable of pulling out the device in an upward direction in order to create the voids in the ore body and movement of ore therein which are an essential feature of the method employed in connection with the present invention. Standard hoists or cranes may be employed for this purpose as the force required for this purpose is well within the range of such commercial equipment. As an illustration, the force needed to pull out a steel pipe having a 1.5 meter diameter and a length of 10 meters does not exceed 20 horsepower. Prior to being pulled out and while leaching is taking place, the device may be slightly rotated, so as to direct the leach liquor discharged through the wall openings against different ore pieces. Toward this end, the device may be equipped with suitable means to bring the required external force to bear. For instance, permanent or removable protruding means near the upper end of the device may engage equipment such as a vehicle, giving the device the slight thrust required for rotation of about 10-20 degrees.

The device, according to the present invention may be provided in the ore body by placing it on the ground prior to construction of the ore body or by placing it on a previously deposited layer of ore. In all cases, the vertical height or length of the elongated device is such that it reaches to the top of the ore body to be leached or protrudes from its upper surface.

According to one embodiment of the invention, the void-creating members are held in place in essentially vertical position during the construction of the pile by a plurality of elongated, rigid support members removably attached or engaged at their upper ends to the upper ends of the void-creating members. The support members are relatively thin and are longer than the void-creating members. Their lower, spread-out ends rest on the leach pad or on a previously deposited layer of ore, i.e., on the same surface of which the void-creating members rest. The lower ends or legs of the support members rest on said surface at a sufficient distance from the void-creating members, for instance in the fashion of a tripod, so as to provide the necessary support for the latter, taking into account the force of ore piled up against the void-creating members.

The void-creating members and/or the support members are provided with means near their upper ends removably to engage or attach to the other during the building of the pile. When each void-creating member is pulled out of the heap in an upward direction, the support members automatically detach or disengage from the void-creating member and remain behind in the heap. The means for engaging and disengaging the support members may be any of the mechanical means known in the art, such as hooks or male and female coupling devices.

The support members also disengage from the void-creating member when the latter is rotated. The detachable support members may be hollow, perforated pipes. Until, detached, they may be charged with leaching solution at their upper ends in order to further introduce leaching solution directly into the ore body at different levels in the manner described.

The device may be positioned in the ore body by suspending it during the construction or building of the heap from a crane or the like, or otherwise holding it in place during the construction of the heap or ore body. The means at the upper end of the device for attaching hoisting machinery may also serve to hold the device in place during the construction of the leach pile and for rotating the device during the leach cycle. Other means may of course be provided.

If the device is of such width at the bottom, i.e., if its cross-sectional configuration at its lower end is such that the device has sufficient stability to stand and to withstand the force of ore being dumped, stacked or piled against it without toppling, then the device resting on the surface of the leach pad or on said layer of ore previously deposited on the leach pad, need not be supported during the building of the heap or pile, or only in its initial phase.

The device and its components are made of materials not significantly corroded by the leaching solution. In the case of leaching gold and silver bearing ores, for instance, the material can be steel.

According to another embodiment of this invention, two or more devices of the types described, but varying in diameter may be employed in combination as sets. Each set comprises at least one first inner device and a second outer device. Specifically, one of the devices of the types described, having a smaller cross-section, is inserted in sleeve-like fashion into another device of the type described having a larger cross-section. Two or more devices forming a set may be used in this manner, there being space between the walls or the outer and inner devices.

The devices are positioned in the leach pile as provided herein. After the leaching has been partially performed, the outer device is pulled out upwardly and the inner device remains in place. The void space between the outer and inner device is filled by the ore pieces which will slightly shift and/or rotate. Partial leaching is continued and then the inner remaining device is pulled out. Ore now fills the new void created, resulting in additional shifting and/or rotation. The leaching is then completed.

If three devices of different diameters or cross-sections are employed as one set, the above described process is repeated three times, each time resulting in a slight movement of ore pieces, which is all that is necessary to improve metal extraction.

Leaching solution may be introduced into the inner and/or outer devices and one or both of the devices may be rotated.

DETAILED DESCRIPTION OF THE DRAWINGS

Referring now to the details of the drawings, there is disclosed in FIG. 1 a tapered device 1 having an open upper end or inlet 2 and an open lower end 3 which has a smaller triangular cross-section than that of inlet 2. Partition 4 has perforations 5. Walls 6 have holes 7, the diameter of holes 7 upwardly increasing between the partition 4 and inlet 2, but even the holes 7 near the upper end of the device are small enough to prevent ore from falling into the hollow device. Openings 8 permit attaching a hoisting mechanism. The slightly wedge-shaped wall pieces 6 are welded together to give the device a somewhat tapered shape which facilitates its pulling out in an upwardly direction.

Figure 2:
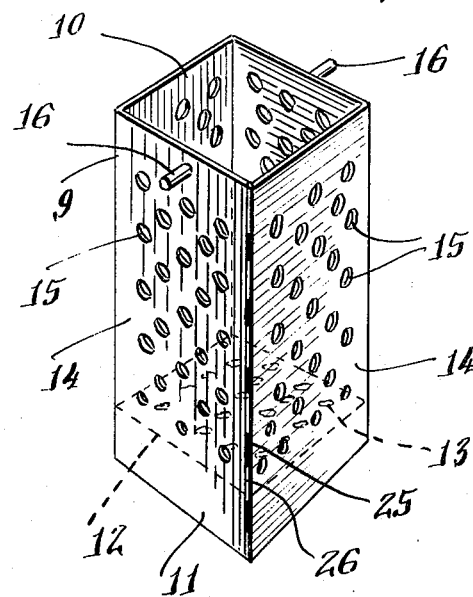
FIG. 2 is a view of a device having a rectangular cross-section.

FIG. 2 discloses a rectangular device 9 made by spot-welding walls 14 at points 25, leaving narrow openings or vertical slits 26 at their seams. The device has upper opening 10 and lower opening 11. Partition 12 has perforations 13 and reinforces the device. Wall perforations 15 increase upwardly in size. Studs 16 aid in attaching a crane and the like.

Figure 3:
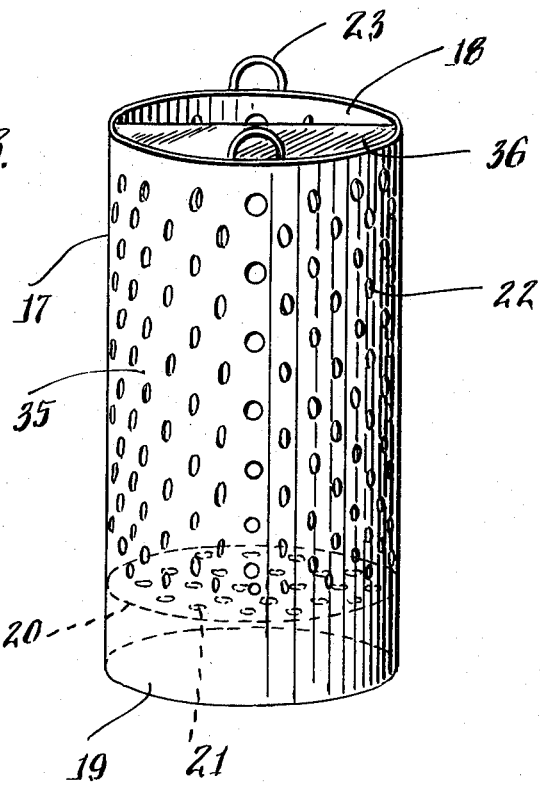
FIGS. 3, 4 and 5 are views of different embodiments of cylindrical devices.

FIG. 3 illustrates a circular device 17 having a partial upper cover or closure 36, and an open upper inlet 18. The open lower end 19 has a diameter wide enough to enable the vertically positioned device to withstand without support the piling up against it of ore from trucks or conveyors with toppling. The device may rest on the leach pad or on an ore layer. The reinforcing lower closure 20 has perforations 21. The cumulative cross-sectional areas of perforations 22 in the cylindrical wall 35 increase upwardly between the lower and upper ends of the device. Handles 23 permit attaching a hoist.

Figure 4:
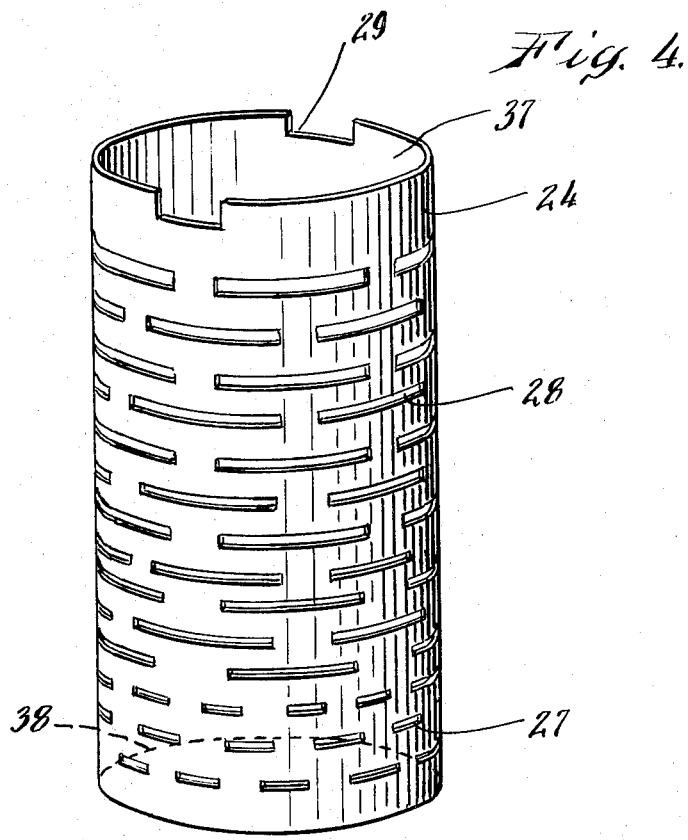

FIG. 4 illustrates a circular device 24 having an open end 37 and an unperforated lower end piece or closure 38. Wall slits 27 near the lower end are narrower and shorter than upper slits 28. Cutouts 29 accommodate a removable bar (not shown) protruding from at least one side to permit rotating the device by applying external force, such as by a small vehicle or other device.

Figure 5:
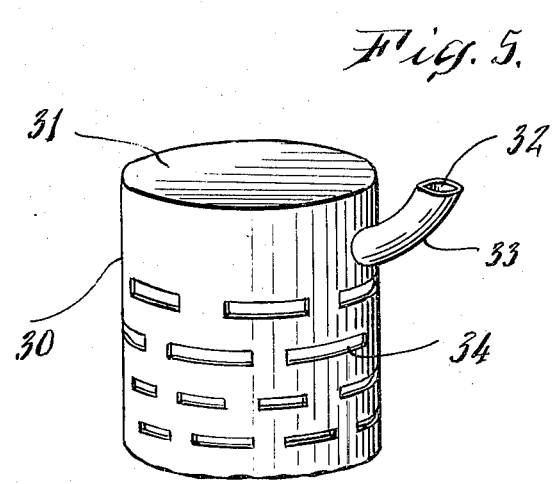

FIG. 5 shows the upper section of a cylindrical device 30 having closed upper end 31, an inlet 33 and inlet opening 32 for leaching solution connected to a pressure feeding device. Slits 34 are widest near the upper end of the device, but narrow enough not to admit crushed ore pieces.

While this invention has been described in conjunction with the embodiments described herein, it is evident that many alternatives, modifications and variations will be apparent to those skilled in the art. Accordingly, the present invention is intended to embrace all such alternatives, modifications and variations and fall within the spirit and scope of the appended claims.

What is claimed is:

1. A device for use in the above-ground heap leaching of metal bearing ores with leaching solution, said device comprising a hollow, elongated member having:
   A. an annular cross-section
   B. a cross sectional area at its lower end sufficiently large to give said hollow member, resting vertically on the leach pad or on a layer of ore, sufficient stability unsupportedly to withstand the piling up of ore against it, during construction of the heap, without toppling,
   C. an inlet opening for leaching solution near its upper end,
   D. a restriction or closure at or near its lower end so that leaching solution fed into said hollow member is accumulated therein,
   E. narrow slits in the wall of said hollow member, above said restriction or said closure, so that a part of the non-weakened leaching solution fed through said upper inlet is discharged near the lower end of said hollow member and contacts ore near the bottom of the heap, wherein
      1. the width of the individual slits is such as to prevent crushed ore pieces of nominal size from passing through said slits and falling into said hollow member, and
      2. the cumulative cross-sectional area of said slits
         (i) is such as to accumulate a volume of leaching solution in said hollow member in excess of the volume discharged from the lower end of said hollow member so as to create hydrostatic pressure therein, and
         (ii) progressively increases upwardly from said closure at such a rate that at least a substantial part of the leaching solution fed into said hollow member through said upper inlet is discharged through hydrostatic pressure through said slits at different levels of the heap, and
   F. means near its upper end for attaching hoisting machinery for pulling out said hollow member in a substantially upward direction so as to create a void in the heap and movement of the ore therein.

2. The device of claim 1 wherein the outer diameter of said hollow member at its lower end is not less than 1.5 meters.

3. The device of claim 1 wherein the means for attaching hoisting machinery also serve as means for attaching machinery to support and position the device in the leach pile during its construction and for engaging external means to rotate the heap leaching device during the leaching cycle.

4. A device for use in the above-ground heap leaching of metal bearing ores with leaching solution, said device comprising a hollow, elongated member having:

A. an annular cross-section,

B. a cross-sectional area at its lower end sufficiently large to give said hollow member resting vertically on the leach pad or on a layer of ore sufficient stability unsupportedly to withstand the piling up of ore against it, during construction of the heap, without toppling, C. inlet means near its upper end for introducing leach liquor under pump or other pressure, D. a restriction or closure at or near its lower end so that leaching solution fed into said hollow member is accumulated therein, E. narrow slits in the wall of said hollow member, above said restriction or closure, so that a part of the non-weakened leaching solution fed through said upper inlet is discharged near the lower end of said hollow member and contacts ore near the bottom of the heap, wherein 1. the width of the individual slits is such as to prevent crushed ore pieces of nominal size from passing through said slits and falling into said hollow member, and 2. the cumulative cross-sectional area of said slits
   (i) is such as to accumulate a volume of leaching solution in said hollow member in excess of the volume discharged from the lower end of said hollow member so as to create pressure therein, and
   (ii) progressively increases upwardly from said closure at such a rate that at least a substantial part of the leaching solution fed into said hollow member through said upper inlet is discharged through said slits at different levels of the heap, and F. means near its upper end for attaching hoisting machinery for pulling out said hollow member in a substantially upward direction so as to create a void in the heap and movement of the ore therein.

5. The device of claim 4 wherein the outer diameter of said hollow member at its lower end is not less than 1.5 meters.

6. The device of claim 4 wherein the means for attaching hoisting machinery also serves as means for attaching machinery to support and position the device in the leach pile during its construction and for engaging external means to rotate the heap leaching device during the leaching cycle.

* * * * *